(No Model.)

A. WRIGHTSON.
KNITTING MACHINE.

No. 261,508. Patented July 18, 1882.

Witnesses:
Jas. F. Tobin
Harry Drury

Inventor:
Arthur Wrightson
By his Attorneys
Howson and Son

UNITED STATES PATENT OFFICE.

ARTHUR WRIGHTSON, OF PHILADELPHIA, PENNSYLVANIA, ASSIGNOR OF ONE-HALF TO CHARLES SHIRTCLIFF, OF SAME PLACE.

KNITTING-MACHINE.

SPECIFICATION forming part of Letters Patent No. 261,508, dated July 18, 1882.

Application filed April 15, 1882. (No model.)

*To all whom it may concern:*

Be it known that I, ARTHUR WRIGHTSON, a citizen of the United States, and a resident of Philadelphia, Pennsylvania, have invented an Improvement in Knitting-Machines, of which the following is a specification.

My invention relates to an improvement in that class of knitting-machines in which portions of the cams are movable for the purpose of varying the character of the work produced, the object of my invention being to provide means for readily shifting these movable portions of the cams from an operative to an inoperative position, and vice versa, and to retain them in position after adjustment.

Figure 1:
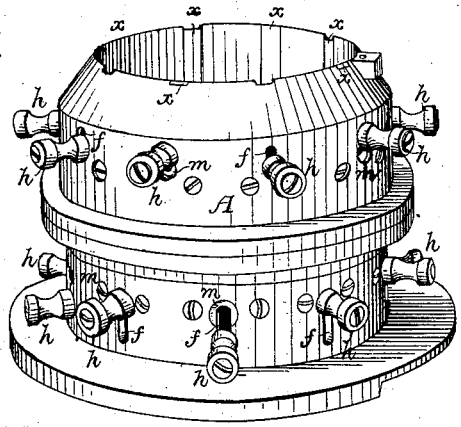
Figure 2:
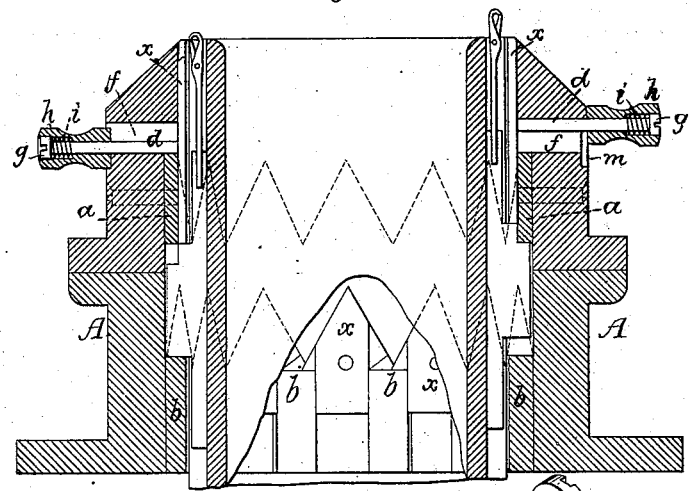
Figure 3:
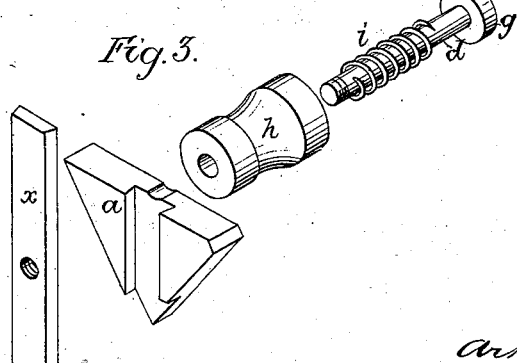

In the accompanying drawings, Figure 1 is a perspective view of the head of a circular-knitting machine with my invention applied thereto; Fig. 2, a sectional view of the head on a larger scale; and Fig. 3, a perspective view of one of the cams and its adjusting and retaining device, the parts being shown detached from each other.

A is the circular frame or head of the machine, to the inside of which are bolted the two sets of cams $a$ and $b$, which act upon the jacks of the needles, as usual, the cams $a$ serving to depress and the cams $b$ to elevate the needles.

Each cam has a central sliding block, $x$, which can be moved to such a position as to form a continuation of the acting face of the cam, or can be retracted, so that it fails to operate on the jacks of the needles, cams of this sort being commonly used in knitting-machines for the production of what is known as "tuck-work."

The movable portion $x$ of each cam has a stem, $d$, which projects through a vertical slot, $f$, in the head A, each stem having an enlarged head, $g$, which is contained within the recessed end of a bolt, $h$, the latter being adapted to slide on the stem, and being acted upon by a spring, $i$, interposed between the head of the stem and the bottom of the recess in the bolt $h$, the tendency of this spring being to thrust the bolt inward against the head A.

In the outer surface of the head A, at one end of each slot $f$, is a circular recess, $m$, these recesses being adapted for the reception of the inner ends of the bolts $h$ when the stems $d$ occupy the ends of the slots adjacent to the recesses, the sliding portions of the cams in such cases being in operative position. The engagement of the bolts with the recesses $m$ thus serves to lock the slides $x$ firmly in position; but said slides can be readily shifted, when desired, by simply withdrawing the bolts $h$ from the recesses $m$ and moving the stems $d$ to the opposite ends of the slots $f$, the action of the springs $i$ then causing the inner ends of the bolts to bear firmly upon the surface of the head A, so that the bolts by frictional contact with the head prevent the accidental jarring of the slides $x$ back into an operative position.

The adjusting and retaining device above described is simple and compact, and does not interfere with the thread-guides or other attachments to the head.

The ends of the bolts need not necessarily be recessed for the reception of the springs $i$ and the enlarged heads of the stems; but this construction is preferred, as it renders the device more compact than if the springs were outside of the ends of the bolts.

In the drawings I have shown all of the cams provided with slides $x$; but in some machines a portion only of the cams may be thus constructed, the other cams being of the usual character.

I claim as my invention—

The combination of the head A, having slots $f$, with recesses $m$, the cams having slides $x$, with stems $d$, the bolts $h$, and the springs $i$, as set forth.

In testimony whereof I have signed my name to this specification in the presence of two subscribing witnesses.

ARTHUR WRIGHTSON.

Witnesses:
HARRY DRURY,
HARRY SMITH.